Feb. 6, 1962     L. J. LARSEN ET AL     3,019,816
CONTROL VALVE FOR DUAL INDEPENDENTLY OPERABLE BRAKING SYSTEMS
Original Filed Dec. 30, 1957     2 Sheets-Sheet 1
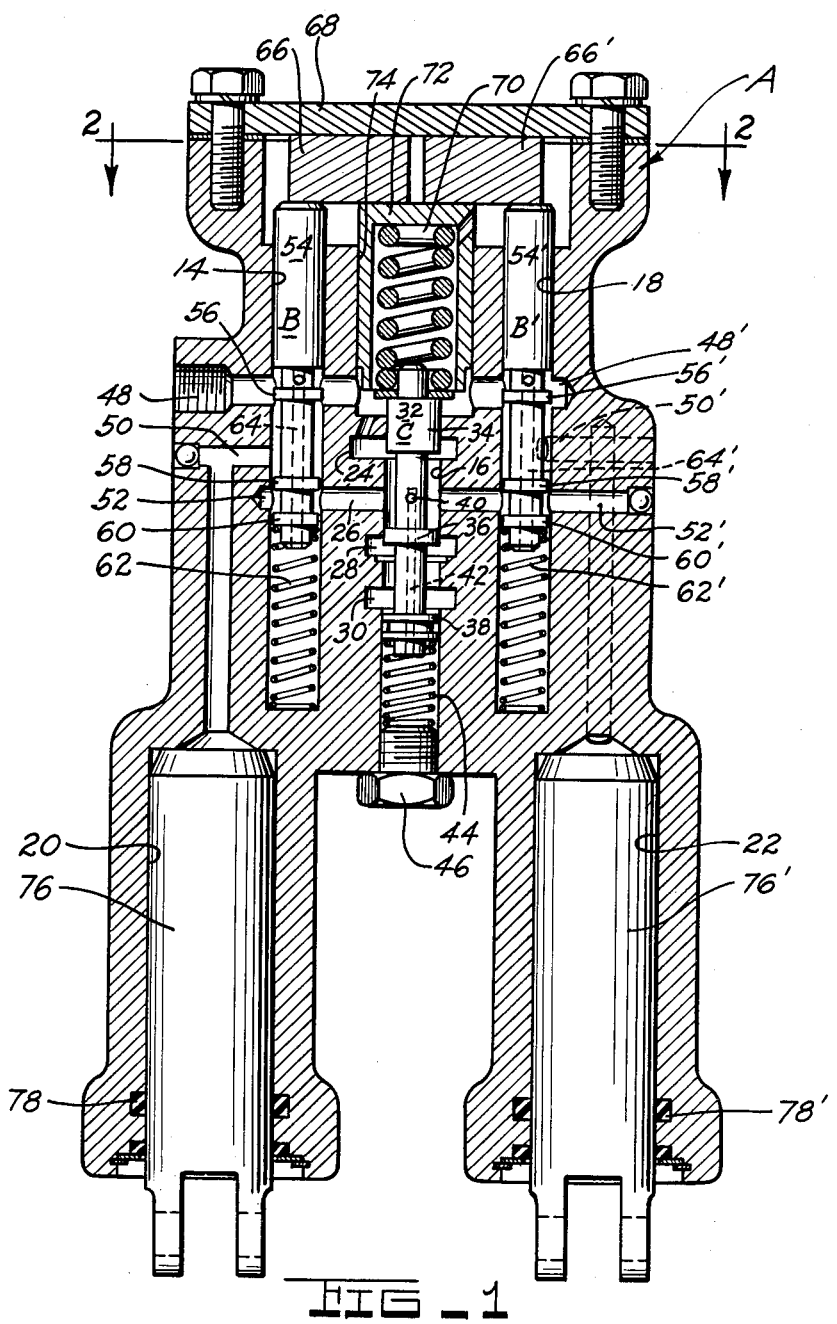
FIG_1
INVENTORS
RICHARD L. LEWIS.
LESTER J. LARSEN.
BY
William P. Hickey
ATTORNEY.

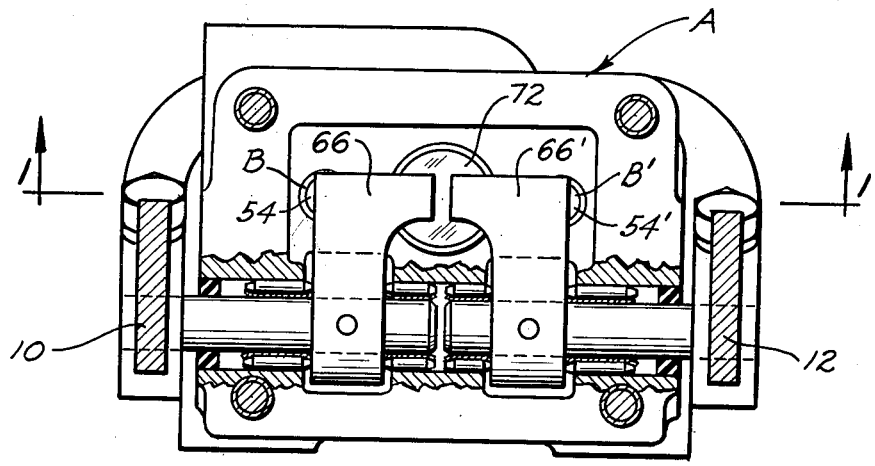
FIG_2
INVENTORS
RICHARD L. LEWIS.
LESTER J. LARSEN.

United States Patent Office 3,019,816
Patented Feb. 6, 1962

3,019,816
CONTROL VALVE FOR DUAL INDEPENDENTLY OPERABLE BRAKING SYSTEMS
Lester J. Larsen and Richard L. Lewis, St. Joseph, Mich., assignors to The Bendix Corporation, a corporation of Delaware
Continuation of abandoned application Ser. No. 705,921, Dec. 30, 1957. This application Mar. 23, 1960, Ser. No. 18,221
3 Claims. (Cl. 137—621)

The present invention relates to a type of control valve which can be used to independently operate two separate systems; and more particularly to a valve of the above described type having but a single modulating valve to achieve pressure modulation in each of the two independently actuated systems. This is a continuation application of my copending application Serial No. 705,921 filed December 30, 1957, now abandoned.

An object of the present invention is the provision of a new and improved valve of the above described type which is simple and rugged in its construction, is smooth and efficient in its operation and which can modulate pressure in one of the systems throughout an appreciable range without affecting the pressure in the other of the actuated systems.

A further object of the invention is the provision of a new and improved hydraulic brake valve and the like which will produce the independent mechanical actuation of either of two braking systems.

The invention resides in certain constructions, and combinations, and arrangement of parts; and further objects and advantages of the invention will become apparent to those skilled in the art to which the invention relates from the following description of the preferred embodiment described with reference to the accompanying drawings forming a part of the specification, in which:

FIGURE 1 is a cross-sectional view of a hydraulic control valve which will independently operate either of two mechanically actuated brake systems and which is taken approximately on the line 1—1 of FIGURE 2;

FIGURE 2 is a cross-sectional view of the valve shown in FIGURE 1 taken approximately on the line 2—2 of FIGURE 1.

The valve shown in the drawing is intended to independently operate the brake structures of the two rear wheels of a farm tractor; and is adapted to be controlled or operated by means of two foot pedal levers 10 and 12, each of which when depressed will cause the valve to actuate one of the controlled brake structures. The valve generally comprises a body member A having five generally longitudinally extending bores therein—the first and third of which, 14 and 18 respectively, are substantially identical and form directing valves for individually communicating pressure with the fourth and fifth bores 20 and 22 respectively; and the second bore 16 of which provides a modulating valve whose operation will supply a modulated pressure to each of the valves formed by the first and third bores, 14 and 18 respectively.

The modulating valve C is what is known as an open center valve in which the pressure supply to the valve is normally communicated directly to a flow-through port without the producing of any appreciable pressure drop in the valve; and the valve is adapted to throttle the flow between the pressure supply port and the flow-through port when the valve is actuated to supply pressure to its control port. The second bore 16 which forms part of the modulating valve is provided with an exhaust port 24, a control port 26, a pressure supply port 28, and a flow-through port 30, arranged in that order in the sidewalls thereof; and a spool or slide member 32 is positioned in the bore 16 with its lands 34 and 36 slidably engaging the sidewalls of the bore 16. The first land 34 controls communication between the exhaust port 24 and the control port 26, and the second land 36 controls communication between the pressure supply port 28 and the control port 26. The land portions 34 and 36 are spaced closer together than are the ports 24 and 28; so that a generally predetermined amount of overlap is provided with respect to portions of the sidewalls of the bore 16 on opposite sides of the control port 26. The spacing of the lands 34 and 36 is such that downward movement of the slide member 32 will increase the amount of sidewall overlap between the exhaust port 24 and the control port 26 while at the same time decreasing the amount of sidewall overlap between the control port 26 and the supply port 28. Sufficient clearance is provided between the slide member 32 and its bore 16 such that a flow of fluid can proceed past the land portions 34 and 36, and such that the pressure in its control port 26 may be varied by changing the amounts of sidewall overlap on opposite sides of the control port 26 to simultaneously regulate the pressure drop from the supply port to the control port and the pressure drop from the control port to the exhaust port. Extremely smooth control of the pressure in the control port is effected by this arrangement; and any pressure fluctuations in the pressure supply port 28 are quite effectively dampened out before reaching the control port 26.

As previously indicated, the modulating valve C is an open center type of valve in which the pressure fluid enters the port 28 and normally proceeds directly to the flow-through port 30, and the pressure in flow-through port 30 will normally vary depending upon the back pressure produced by any valving etc., which receives its pressure supply from the flow-through port 30. When a back pressure is experienced in the flow-through port 30, inward movement of the slide 32 will cause the land 34 to close off the exhaust port 24 from the control port 26 and a pressure in the control port 26 will be established depending upon the relative amounts of sidewall overlap of the lands 34 and 36 with respect to the sidewall portions between the ports 24 and 26, and 26 and 28 respectively. When the land 36 completely opens the pressure supply port 28, the full pressure existing in the flow-through port 30 will be delivered to the control port 26. When very little back pressure is experienced in flow-through port 30, continued inward motion of the slide member 32 will cause the lower edge of the land 36 to approach the bottom edge of the pressure supply port 28 and thereby effect a throttling action of the pressure supply entering through the supply port 28.

The land 36 is of an axial dimension or width which is less than the width of the port 28, so that the top of the land 36 will be open with respect to the top edge of the port 28 when the bottom edge of the land 36 starts a throttling action with respect to the lower edge of the port 28. The pressure produced in the pressure supply port 28 will therefore be communicated directly to the control port 26; and the amount of pressure developed in the port 28 is regulated by varying the clearance between the lower edge of the land 36 and the lower edge of the supply port 28.

The lower edge of the slide member 32 is also provided with a land portion 38 to guide the lower end of the spool, and at the same time seal off the lower end of the bore 16 to provide a reaction chamber which is supplied with control pressure by means of intercepting transverse and longitudinal drillings, 40 and 42 respectively. Control pressure against the bottom end of the spool 32 provides a reaction which opposes the actuating movement of the slide member 32 by an amount generally proportional to the output pressure of the valve; and the spool 32 is biased into its normal or deactuated upper position by a coil spring 44 positioned between the lower end of the slide member 32 and a plug 46 which seals off the bottom end of the bore 16.

As previously indicated, the directing valves B and B' are similar in their construction and operation and each receives its pressure supply from the modulating valve C (only one therefore need be described in detail). Corresponding parts of the two valves B and B' will be designated by like reference numerals with the reference numerals for one of the valves being further characterized by having a prime mark affixed thereto. The directing valves B, B' have exhaust and control and pressure ports 48, 50, and 52 respectively, formed in their sidewalls in the same order that the corresponding ports of the modulating valve are arranged. The pressure ports 52 and 52' of the directing valves B and B', and the control port 26 of the modulating valve C are conveniently connected by a single transverse drilling in the body member A; so that the control pressure from the modulating valve C becomes the pressure supply for each of the modulating valves. The spool or slide members 54 and 54' are positioned in the respective bores 14 and 18, and each has a pair of lands 56 and 58 which are spaced apart a distance slightly less than the spacing of the exhaust port 48 and the pressure port 52. The lands 56 and 58 are so spaced that inward movement of their spool members 54 and 54', respectively, causes their lands 56 and 56' to first close off communication between the control ports 50 and 50' and the exhaust ports 48 and 48' before the lands 58 and 58' open communication between control ports 50 and 50' and the pressure ports 52 and 52'. The slide members 54 and 54' are also provided with a third land portion 60 and 60' to guide the lower end of the slide members 54 and 54' with respect to the lower end of their respective bores. The spool members 54 and 54' are biased upwardly into their normal position by means of coil springs 62 and 62' positioned between the lower end of the respective slide members and the bottom end of their respective bores; and suitable internal drilled passages 64 and 64' are provided in the slide members 54 and 54' to vent the lower end of the respective bores 14 and 16 with their return ports 48 and 48'.

In order to achieve the following described sequential operations the spacing of the lower end of the land 56 with respect to the exhaust port 48, when its spool 54 is in its normal position, will preferably be less than the spacing between the upper edge of the land 58 and the upper edge of the pressure port 52; which in turn is less than the clearance provided between the lower end of the land 34 of the modulating valve C and the lower end of its exhaust port 24, when the spool 32 of the modulating valve C is likewise in its normal position. The slide member 54 of the directing valve B and the slide member 32 of the modulating valve C are adapted to be moved inwardly from their normal positions by a crank arm 66 that is suitably journalled in the body member A and which in turn is actuated by the brake lever 10. The slide member 54' of the modulating valve B', and the slide member 32 of the modulating valve C are adapted to be moved inwardly simultaneously from their normal position by the crank arm 66', which is likewise suitably journalled in the body member A and is actuated by the brake pedal lever valve 12. The normal upper positions for the slide members 54 and 54' are established by their engagement with the cranks 66 and 66' respectively when the top surface of the cranks have been rotated into engagement with the top cover plate 68. The normal position for the slide member 32 of the modulating valve C is established by the uncompressed condition of a relatively stiff coil spring 70 suitably positioned between the top end of the slide member 32 and a plunger 72 that is slidably received in a counter bore 74 in the upper end of the bore 16, and which plunger 72 engages the under surface of each of the crank arms 66 and 66'.

When the operator desires to apply the left brake of the tractor, he depresses the foot pedal lever 10 to rock the crank arm 66 downwardly, thereby simultaneously forcing the slide member 54 of the directing valve B and the plunger 72 of the modulating valve C inwardly. Simultaneous inward movement of the slide valve 54 and plunger 72 first causes the land 56 of the slide member 54 to close off exhaust port 48 from its control port 50, and thereafter open communication between its control port 50 and its pressure port 52. This takes place prior to the time that the land 34 of the modulating valve C closes off its exhaust port 24; and upon further downward movement of the crank arm 66, the land 34 begins to overlap with the portion of the sidewalls of the bore 16 intermediate exhaust port 24 and control port 26, while at the same time reducing the amount of overlap between the land 36 and the portion of the sidewalls of the bore 16 between its control port 26 and its pressure supply port 28. When a pressure is available in the supply port 28, flow immediately proceeds past the land 36 to the control port 26 to build up pressure in the control port 50 of the directing valve B and will continue until such time as the fluid demand of the system to which the control port 50 is connected ceases; whereupon all of the fluid which flows past the land 36 must also flow out past the land 34 to establish a control pressure in the control port 26 depending upon the relative pressure drops across the lands 36 and 34, which in turn is dependent upon their relative sidewall overlaps.

The control pressure in the port 26 is also supplied to the bottom end of the slide member 32 to provide a reaction force which compresses the coil spring 70; so that the spool 32 will position itself to provide a pressure in the control port that will be substantially directly proportional to the downward positioning of the crank arm 66. Downward movement of the crank arm 66 may be stopped at any time that the desired intensity of brake application is achieved; whereupon the spring 70 permits the slide member 32 to maintain a substantially constant pressure in the control port 50 of the directing valve B. When the brake pedal lever 10 is fully depressed, the plunger 72 will be forced into engagement with the bottom end of the counter bore 74 to thereby limit the amount of force applied to the coil springs 70 and in turn limit the discharge pressure of the modulating valve C. In the valve shown in the drawing, the coil spring 70 is so proportioned with respect to the diameter of the bottom end of the slide member 32, such that this will occur at approximately 1600 p.s.i. which is somewhat below the setting of the relief valve of the pump which supplies fluid to the pressure supply port 28. A similar operation for the directing valve B' and modulating valve C occurs upon the depressing of the foot pedal lever 12, which will be readily apparent to those skilled in the art, and so will not be elaborated upon.

As previously indicated, the modulating valve C is of the open center type where the fluid pressure supplied to the port 28 is normally communicated directly to the flow-through port 30; and in those instances when substantially no back pressure is being held upon the flow-through port 30, actuation of either of the cranks 66 and 66' does not produce pressure flow to the directing valves B or B' as previously set forth. When a back pressure does not exist in the flow-through port 30, it will be necessary to continue the inward movement of the appropriate slide members 54 and 54' and the slide member 32, until such time as the lower end of the land 36 approaches the lower edge of the pressure supply port 28. When this occurs, the top edge of the land 36 will have opened with respect to the top edge of the pressure supply port 28; and further inward movement thereafter will decrease the clearance between the lower edge of the land 36 and the lower edge of the supply port 28 to increase the amount of back pressure supplied to the control port 26. This requires that the appropriate foot pedal lever be depressed slightly further than was necessary to apply the brakes when back pressure was being supplied to the flow through port 30; but once restriction is achieved by the land 36, pressure will be produced in the appropriate control port 50 and 50′ in a similar manner to that previously described.

Inasmuch as the "crack point" of the slide member 32 of the modulating valve C takes place, when no back pressure is supplied to the flow-through port 30, at a position wherein the slide member 32 is slightly inwardly from the position at which "crack point" is achieved when back pressure is being supplied to the flow-through port 30; slightly less force will be applied to the coil spring 70 when the plunger 72 abuts the bottom of the counterbore 74. Under such conditions the maximum pressure produced by the valve will be slightly less than the 1600 p.s.i. pressure previously described for the condition where a back pressure in excess of this amount was being held against the flow-through port 30. It will thus be seen that the maximum back pressure which can be produced by the valve of the present invention will at times be below a predetermined maximum—which predetermined maximum if less than the relief valve setting of the pump connected to the supply port 28, will prevent the valve from completely shutting off all flow through the flow-through port 30.

The control ports 50 and 50′ of the directing valves B and B′ respectively may in some instances be communicated by suitable conduits to remotely located brake actuated hydraulic cylinders; but in the case of some types of farm machinery will preferably be communicated through internal passages in the body member A to the bores 20 and 22 respectively, which contain hydraulic pistons 76 and 76′ respectively, and by means of which, mechanical forces can be implemented directly from the body member A. Suitable O-ring seals 78 and 78′ are provided in the bottom end of the bores 20 and 22 respectively; and each of the pistons 76 and 76′ is provided with a clevis arrangement for the attachment to independently operable brake actuating mechanisms. By means of such an arrangement a substantial simplification of brake actuating mechanism is produced having no external conduits that can be ruptured or damaged through usage.

While the invention has been described in considerable detail, I do not wish to be limited to the particular construction shown and described; and it is my intention to cover hereby all novel adaptations, modifications and arrangements thereof which come within the pratice of those skilled in the art to which the invention relates and which comes within the scope of the following claims.

We claim:

1. In a control wave for controlling pressure in two separate systems: a valve body member having two motor ports whose pressure supply is to be modulated, first and second individual flow directing valve chambers each of which chambers has an exhaust port, a control port communicating with one of said motor ports, and a pressure port; first and second control members for respective ones of said first and second valves each of which when moved in one direction closes off its exhaust port from its control port and thereafter opens communication between its control port and its pressure port; a modulating valve comprising a longitudinally extending bore in said body member having an exhaust port, a control port communicating with said pressure ports, and a pressure supply port arranged in that order in the sidewalls of said bore; a third control member in said bore having a pair of lands one of which in the normal position of the third control member provides a maximum sidewall overlap between its supply and control ports while the other is open with respect to its exhaust port, and which when actuated provides increasing sidewall overlap between its control and exhaust ports while decreasing sidewall overlap between its control and supply ports; a first actuating means which simultaneously moves said first and third control members in their actuating directions; and a second actuating means which simultaneously moves said second and third control members in their actuating directions; said first and second directing valves and said modulating valve being so constructed and arranged with respect to each other to ensure upon each operation of each of said actuating means that the pressure ports of said directing valves are normally closed and are opened at a time when a pressure, relatively low to the maximum pressure to be supplied to said pressure supply port, is supplied said pressure ports by said modulating valve.

2. In a hydraulic brake actuating system for farm machinery and the like: a body member having first, second and third bores therein, said first and third bores each having an exhaust, a motor port, and a pressure port spaced apart in that order in the sidewalls thereof from one surface of said body member, said second bore having an exhaust port, a control port communicating with said pressure ports, and a pressure supply port spaced apart in that order in the sidewalls thereof from said surface; first and third slide members in respective ones of said first and third bores each having a pair of lands one of which in the normal position of the slide member provides sidewall overlap between its pressure and motor ports while the other is open with respect to its exhaust port, and which when actuated opens its pressure port and provides sidewall overlap between its motor and exhaust ports; a second slide member located in said second bore and having a pair of lands one of which in the normal position of the slide member provides a maximum sidewall overlap between its supply and control ports while the other is open with respect to its exhaust port, and which when actuated provides increasing sidewall overlap between its control and exhaust ports while decreasing sidewall overlap between its control and supply ports; a first actuating means which simultaneously actuates said first and second slide members; and a second actuating means which simultaneously actuates said second and third slide members; said ports being so constructed and arranged that said actuating means when moved from their normal positions first opens up its respective pressure port before appreciable pressure is built up in its respective pressure port by its movement of said second slide member.

3. In a hydraulic brake actuating system for farm machinery and the like: a body member having first, second and third generally parallel bores therein, said first and third bores each having an exhaust, a motor port, and a pressure port spaced apart in that order in the sidewalls thereof from one surface of said body member, said second bore also having an exhaust port, a control port communicating with said pressure ports, and a pressure supply port spaced apart in that order in the sidewalls thereof from said surface; first and third slide members in respective ones of said first and third bores each having a pair of lands one of which in the normal position of the slide member provides sidewall overlap between its pressure and motor ports, while the other is open with respect to its exhaust port, and which when moved inwardly from said surface opens its pressure port and provides sidewall overlap between its motor and exhaust ports; a second slide member located in said second bore and having a pair of lands one of which in the normal position of the slide member provides a maximum sidewall overlap between its supply and control ports while the other is open with respect to its exhaust port, and which when moved inwardly from said surface provides increasing sidewall overlap between its control and exhaust ports while decreasing sidewall overlap between its control and supply ports; a first actuating means for simultaneously moving said first and second slide members inwardly; and a second actuating means for simultaneously moving said second and third slide members inwardly; said ports being so spaced that said actuating means when moved from their normal positions first opens up its respective pressure port before any substantial closing of the exhaust port in said second bore is effected by said second slide member.

References Cited in the file of this patent
UNITED STATES PATENTS
2,941,639     Christenson et al. _____ June 21, 1960